(12) United States Patent
Griesmayr et al.

(10) Patent No.: US 9,339,059 B2
(45) Date of Patent: May 17, 2016

(54) MOUTHPIECE LINING PAPER, FORMED AS A FILM/FOIL, OF A FILTER CIGARETTE

(71) Applicant: TANNPAPIER GMBH, Traun (AT)

(72) Inventors: Guenther Griesmayr, Wels (AT); Barbara Puehringer, Oftering (AT); Bernhard Knauseder, Leonding (AT)

(73) Assignee: TANNPAPIER GMBH, Traun (AT)

( * ) Notice: Subject to any disclaimer, the term of this patent is extended or adjusted under 35 U.S.C. 154(b) by 115 days.

(21) Appl. No.: 14/368,254

(22) PCT Filed: Dec. 21, 2012

(86) PCT No.: PCT/AT2012/050203
§ 371 (c)(1),
(2) Date: Jun. 23, 2014

(87) PCT Pub. No.: WO2013/090968
PCT Pub. Date: Jun. 27, 2013

(65) Prior Publication Data
US 2015/0027478 A1    Jan. 29, 2015

(30) Foreign Application Priority Data

Dec. 23, 2011 (AT) ................................ A 1886/2011

(51) Int. Cl.
*A24C 5/56* (2006.01)
*B29C 59/16* (2006.01)
(Continued)

(52) U.S. Cl.
CPC . *A24C 5/56* (2013.01); *A24C 5/465* (2013.01); *A24D 3/18* (2013.01); *B05D 5/02* (2013.01); *B29C 59/02* (2013.01); *B29C 59/165* (2013.01); *B29K 2001/00* (2013.01)

(58) Field of Classification Search
USPC .......................................... 131/336, 361, 365
See application file for complete search history.

(56) References Cited

U.S. PATENT DOCUMENTS

| 2,755,206 | A | 7/1956 | Statia |
| 3,460,959 | A | 8/1969 | Neuhaus |

(Continued)

FOREIGN PATENT DOCUMENTS

| AT | 260756 | 3/1968 |
| CN | 2193654 | 4/1995 |

(Continued)

OTHER PUBLICATIONS

Definition of "lacquer", The Free Dictionary by Farlex, [online], No Date, retrieved from the Internet on May 8, 2015, URL: http//www.thefreedictionary.com/lacquer.

(Continued)

*Primary Examiner* — Dennis Cordray
(74) *Attorney, Agent, or Firm* — Brooks Kushman P.C.

(57) ABSTRACT

A mouthpiece lining paper of a filter cigarette, which mouthpiece lining paper is provided on surface regions to be adhesively bonded with a three-dimensional surface structure, that is to say with a surface which has elevations and/or depressions, wherein the elevations and depressions protrude from and are set back from the film/foil surface only locally, respectively. The mouthpiece lining paper is a film/foil. In one preferred embodiment, a row of elevations and/or depressions runs along an edge of the mouthpiece lining paper of the type which runs along the overlap region of the mouthpiece lining paper with itself on the finished cigarette.

22 Claims, 4 Drawing Sheets

(51) Int. Cl.
    *B29C 59/02*        (2006.01)
    *B05D 5/02*         (2006.01)
    *A24D 3/18*         (2006.01)
    *A24C 5/46*         (2006.01)
    *B29K 1/00*         (2006.01)

(56) References Cited

U.S. PATENT DOCUMENTS

| | | | |
|---|---|---|---|
| 3,916,914 | A | 11/1975 | Brooks et al. |
| 4,121,595 | A | 10/1978 | Heitmann et al. |
| 4,185,643 | A | 1/1980 | Riedesser |
| 4,286,605 | A | 9/1981 | Goslin et al. |
| 4,295,478 | A | 10/1981 | Yeatts |
| 4,361,156 | A | 11/1982 | Hall |
| 4,411,279 | A | 10/1983 | Martin et al. |
| 4,434,805 | A | 3/1984 | Hall |
| 4,583,558 | A | 4/1986 | Luke |
| 4,614,199 | A | 9/1986 | Berger |
| 4,643,205 | A | 2/1987 | Redding et al. |
| 4,675,064 | A | 6/1987 | Berger |
| 4,869,275 | A | 9/1989 | Berger |
| 6,832,613 | B2 | 12/2004 | Brunbauer |
| 2003/0178039 | A1 | 9/2003 | White et al. |
| 2008/0029111 | A1 | 2/2008 | Dube et al. |
| 2008/0156336 | A1 | 7/2008 | Wyss-Peters et al. |
| 2010/0108084 | A1 | 5/2010 | Norman et al. |
| 2011/0155000 | A1* | 6/2011 | Kaljura ............... A24C 5/471 101/5 |
| 2012/0240948 | A1 | 9/2012 | Griesmayr |
| 2013/0093117 | A1 | 4/2013 | Griesmayr |
| 2013/0139837 | A1* | 6/2013 | Kaljura ............... A24C 5/005 131/365 |

FOREIGN PATENT DOCUMENTS

| | | |
|---|---|---|
| CN | 201141102 | 10/2008 |
| CN | 201365521 | 12/2009 |
| CN | 201365522 | 12/2009 |
| CN | 202157246 | 3/2012 |
| CN | 202416072 | 9/2012 |
| DE | 630817 | 6/1936 |
| DE | 1928432 | 12/1965 |
| DE | 1532252 | 2/1970 |
| DE | 1757235 | 4/1971 |
| DE | 2327822 | 12/1974 |
| DE | 2743986 | 4/1979 |
| DE | 2927893 | 10/1984 |
| DE | 3005793 | 5/1985 |
| DE | 3411511 | 6/1995 |
| DE | 102005025758 | 12/2006 |
| EP | 0539009 | 4/1993 |
| EP | 0838166 | 4/1998 |
| EP | 1044615 | 10/2000 |
| EP | 1891866 | 2/2008 |
| EP | 1942753 | 5/2009 |
| EP | 1895863 | 12/2009 |
| GB | 269194 | 12/1927 |
| GB | 294492 | 5/1929 |
| GB | 334271 | 9/1930 |
| GB | 337501 | 11/1930 |
| GB | 433228 | 8/1935 |
| GB | 1422286 | 1/1976 |
| GB | 2135912 | 9/1984 |
| GB | 2199726 | 7/1988 |
| WO | 0158289 | 8/2001 |
| WO | 2004052128 | 6/2004 |
| WO | 2006128551 | 12/2006 |
| WO | 2007052170 | 5/2007 |
| WO | 2008019281 | 2/2008 |
| WO | 2009027331 | 3/2009 |
| WO | 2010051076 | 5/2010 |
| WO | 2011001200 | 1/2011 |
| WO | 2011038430 | 4/2011 |
| WO | 2011042353 | 4/2011 |
| WO | 2011060459 | 5/2011 |
| WO | 2013046327 | 4/2013 |

OTHER PUBLICATIONS

International Search Report for PCT/AT2012/050203, English translation attached to original, Both completed by the European Patent Office on Apr. 25, 2013, All together 7 Pages.

* cited by examiner

MOUTHPIECE LINING PAPER, FORMED AS A FILM/FOIL, OF A FILTER CIGARETTE

CROSS-REFERENCE TO RELATED APPLICATION

This application is the U.S. national phase of PCT Application No. PCT/AT2012/050203 filed on Dec. 21, 2012, which claims priority to AT Patent Application No. A 1886/2011 filed on Dec. 23, 2011, the disclosures of which are incorporated in their entirety by reference herein.

The invention relates to a mouthpiece lining paper, formed as a film/foil, of a filter cigarette.

In this document, "foil" means a thin sheet of plastic, which per se is not constructed from fibers in the same way as paper or textiles, but is essentially a monolith. The word "film" could also be used instead of "foil".

Five essential parts of a conventional filter cigarette are the tobacco strand, the cigarette paper wrapping this, the filter, the filter wrapping paper directly wrapping this, and the mouthpiece lining paper.

The mouthpiece lining paper, often also designated as "tipping paper" or, in brief, "tipping", is that part of the filter cigarette which is touched by the lips of the person smoking the cigarette when the filter cigarette is being smoked. It wraps the filter part and usually also projects slightly in the longitudinal direction of the filter cigarette into the longitudinal region of the tobacco strand and encases the cigarette paper there. It is connected to the filter wrapping paper and to the cigarette paper by means of an adhesive bond. The filter part and tobacco strand part are connected mechanically in the cigarette machine by this adhesive bond being made. The mouthpiece lining paper is mostly, in actual fact, a paper, but it may also be a foil. If the mouthpiece lining paper is formed as a foil, it may be composed, for example, of cellulose hydrate. In the present document, the designation "mouthpiece lining paper" is used, even if this is not formed by an actual paper, but by a foil.

In the cigarette machine, the mouthpiece lining paper is connected to the filter wrapping material and to the cigarette paper by adhesive bonding. The mutually overlapping ends of the filter wrapping paper wound around the cigarette are likewise connected to one another by adhesive bonding. The adhesive used is, as a rule, a glue which, after being applied to the body to be adhesively bonded, increases in viscosity and in adhesiveness, above all, as a result of the transfer of water to this.

In a conventional cigarette machine, the mouthpiece lining paper is unrolled from a reel (roll), is drawn in the junctured state around what is known as a prebreaker (a sharp edge of a ceramic body), is provided on the individual surface regions with a glue layer, is cut into individual pieces and is connected by adhesive bonding to a filter part of double length and to two tobacco strand parts resting against the latter on the end face on both sides and also, in an overlap region, to itself, in that it is wound around these parts to an extent such that it overlaps itself over a short distance. Finally, the body thus formed is divided into two cigarettes in that it is cut through in the longitudinal center of the filter part of double length. U.S. Pat. No. 4,361,156 A describes, for example, the processing path of the mouthpiece lining paper in the cigarette machine from unwinding from the reel, through prebreaking to the application of glue and up to combination with the further parts of the cigarette.

An important limiting factor for the quantity of cigarettes which can be produced per unit time by a cigarette machine is the time duration which must elapse from the application of glue to the mouthpiece lining paper until the adhesive strength brought about by the glue between the individual layers is so good that these layers no longer have to be held against one another mechanically from outside and layers do not come loose when the cigarettes are maneuvered any further.

If the layers to be adhesively bonded by glue tend to the rapid sorption of water onto their surface (adsorption) or into their volume (absorption), water is extracted very quickly from the applied glue during the glue coating process and the adhesive bond attains the required adhesive strength very quickly.

This sorption of water from the glue takes place very quickly when genuine papers are used as the mouthpiece lining paper and as the filter wrapping material. However, foils made, for example, from cellulose hydrate are also likely to be used for these layers. Foils, if only because of their low or absent porosity, generally do not have the ability to bind water quickly by sorption. Moreover, at the microscopic level, foils have a substantially smaller surface than papers, and also the surface of foils is hardly structured, in contrast to that of paper. Foils made from cellulose hydrate admittedly absorb water, but not very quickly. If a foil of this type comes into contact with a large amount of water, moreover, it experiences disturbing deformation.

When glue is used, therefore, foils cannot be adhesively bonded as quickly as papers. For this reason, hitherto, when foils have been used as mouthpiece lining paper, the pertaining production rates of cigarette machines are well below those when genuine paper is used as mouthpiece lining paper. The attainable production rate is especially low if not only the mouthpiece lining paper is a foil, but also the filter wrapping paper and/or the cigarette paper.

It was already proposed in 1929 in GB 294492 A to form the mouthpiece lining paper from a composite of two layers adhesively bonded to one another, to be precise of an outer foil and of an inner paper. The foil has the tactile and visual properties desired; the desired rapid bondability is achieved by means of the paper. The disadvantage, above all, is that the composite material is relatively thick-walled and stiff and is consequently difficult to process. It is also relatively costly.

It was already proposed in 1930 in the documents GB 334271 A and GB 337501 A to form a mouthpiece lining paper from a foil composed of two interconnected layers of cellulose ester or cellulose ether, the outer layer being highly water-tight and containing visually relevant additives, such as color pigments or metal powders, and the inner layer having additives which improve the adhesive bonding property to a paper by means of aqueous adhesives, particularly in that they impair the water-tightness. For this purpose, for example, lithopone (white pigment of barium sulfate) or magnesium oxide is added to the inner layer. This set-up was ultimately unsuccessful, either because the adhesive bonding properties were not improved sufficiently for truly high-speed production in the cigarette machine or because the mouthpiece lining paper was very stiff and was therefore difficult to process. Serious problems sometimes also arose because the mouthpiece lining paper formed in this way, when the sides to be adhesively bonded came into contact with aqueous glue, was overly deformed in an undesirable way, to be precise was bent in the opposite direction to the desired direction.

It is proposed in GB 1 422 286 to form a mouthpiece lining paper from a plastic foil and a lacquer coating applied to this, for example with the appearance of cork. In order to improve the adhesion of the lacquer coating on the foil, it is proposed to roughen, before coating, the side of the foil which is to be coated. The problems in the cigarette machine regarding adhesive bonding by glue are not essentially changed by the lacquer coating.

GB 2 199 726 A describes a mouthpiece lining paper which, for decoration reasons, has a "nonplanar marginal zone" only on that marginal region which, on the finished cigarette, runs around the cigarette on the tobacco strand side. For individual embodiments, it is additionally proposed to provide the mouthpiece lining paper with local embossing on said marginal region. So that forming can be assisted by means of a thermal process, it is suggested to use a mouthpiece lining paper which has a thermoplastic material fraction.

For legal reasons, above all, it is not seriously considered to use, for the adhesive bonding of mouthpiece lining papers formed by a foil, adhesives other than the glues which are customary for the adhesive bonding of paper and which harden as a result of the transfer of water.

The object on which the present invention is based is, therefore, to provide a mouthpiece lining paper which is formed from a foil and which is more flexible than the above-described multilayer mouthpiece lining papers having a foil layer and which at the same time can be connected more quickly by glue, which increases its viscosity and adhesive strength at the transfer of water, than previous mouthpiece lining papers constructed as a single-layer foil.

To achieve the object, it is proposed to provide the mouthpiece lining paper, at least on the surface regions to be adhesively bonded, with a three-dimensional surface structure, that is to say with a surface which has elevations and/or depressions, these elevations and depressions respectively rising out of the surface and being set back from this only locally (and not as a continuous coating or large-area removal). A positive effect upon adhesive bonding becomes noticeable when the projection or setback with respect to the original foil surface amounts to at least 0.5 µm, and if at least 2 height jumps occur per centimeter in any direction parallel to the surface.

Markedly better results are achieved when the projection or setback with respect to the original foil surface amounts to at least 1.5 µm and when at least 10 height jumps occur per centimeter in any direction parallel to the surface.

Ideally, the foil surface has at least 5 height jumps per millimeter in any direction parallel to the surface. (This is equivalent to a maximum spacing between the height jumps of 200 micrometers.)

By the surface being configured from elevations, depressions and intermediate height jumps, the surface is enlarged, and also the mechanical anchoring to one another of the components to be connected during adhesive bonding is improved. Since the elevations and depressions are formed only locally, the flexibility and therefore the processability of the mouthpiece lining paper in the cigarette machine remain relatively undisturbed by these. Since, when the layers to be connected are pressed onto one another, there remain between the elevations and in the depressions cavities, into which excess glue can flow and at which no pressure force takes effect, the pressure (that is to say, the force per unit area) is increased at the actual contact points, with the result that the remaining glue layer becomes thinner and can therefore transfer more quickly sufficient water to achieve sufficiently high adhesive strength.

The effect is improved, in general, the larger the height jumps are and the more height jumps are accommodated per unit area or length of foil. Very good effectiveness is achieved with height jumps from about 5 µm.

It is especially useful to provide a row of elevations and depressions according to the invention and of intermediate height jumps along at least one of those two margins of the mouthpiece lining paper which, on the finished cigarette, run parallel to the longitudinal direction of the cigarette and delimit those surfaces where the mouthpiece lining paper overlaps itself on the finished cigarette, so that mouthpiece lining paper is glued to the mouthpiece lining paper there. Since local elevations and depressions are present along at least one of these two margins, the problem, often occurring in cigarette production with foil mouthpiece lining paper and designated as "open seam", that the adhesive bonding of the mouthpiece lining paper to itself comes loose in the overlap region is effectively overcome.

It is not absolutely necessary that said row of said elevations and depressions and intermediate height jumps extends over the entire length of the overlap region (=the dimension of the mouthpiece lining paper in the cigarette longitudinal direction). However, such a row should extend at least from the two longitudinal ends of the overlap region in each case over a quarter of the total length of the overlap region.

The various possibilities for producing the elevations and depressions according to the invention are discussed further below.

The invention is explained in more detail by means of drawings.

Figure 1:
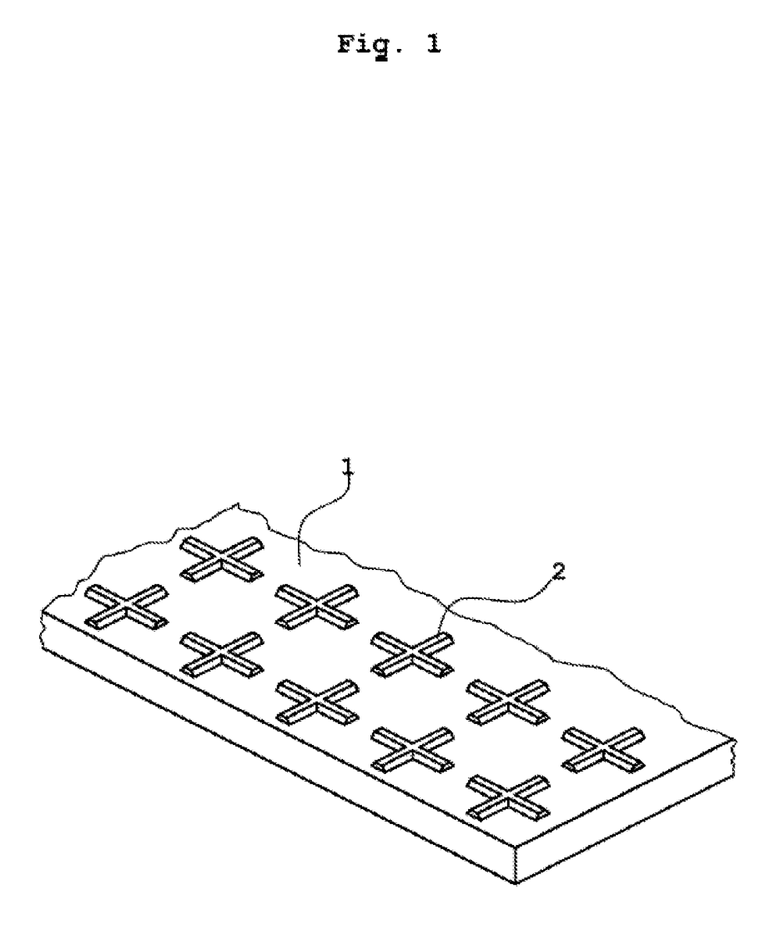
FIG. 1 shows a stylized perspective illustration of a portion of a first mouthpiece lining paper according to the invention.
Figure 2:
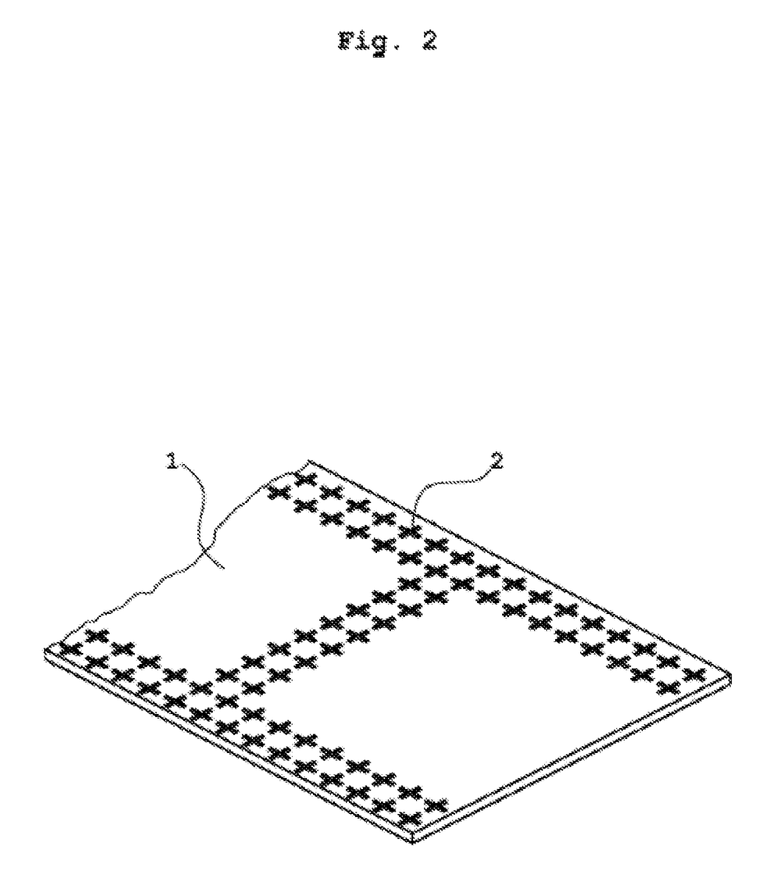
FIG. 2 shows a larger piece of the mouthpiece lining paper of FIG. 1 on a scale reduced in comparison with FIG. 1.

The mouthpiece lining paper according to FIG. 1 and FIG. 2 is composed of a foil 1 and of a pattern of local elevations 2 which may be formed by structural lacquer. The side of the foil 1 on which the elevations 2 are located is that which constitutes the inside of the mouthpiece lining paper on the finished cigarette.

A structural lacquer in the context of this description is a lacquer known per se, by means of which a fine grid of a perceptibly raised structure can be printed on a surface, for example, for this purpose, 5 to 30 lines per cm which lie next to one another and which rise by 5 µm to 30 µm from non-printed surface regions can be printed. However, finer structures, for example with 100 lines per cm which lie next to one another, can also be printed thereby.

Since the elevations 2 of the mouthpiece lining paper according to FIG. 1 and FIG. 2 have no continuous "hill ridges", but instead the individual elevations are spaced apart from one another in an island-like manner, the mouthpiece lining paper is scarcely changed, with respect to bending deformation about some axes, in comparison with mouthpiece lining paper which has no elevations 2. As demonstrated, above all, in FIG. 2, it is not necessary for the entire surface of the foil to be provided with a pattern of elevations 2. It is sufficient to provide the elevations 2 along those lines which are especially important for the adhesive bonding of the mouthpiece lining paper. In particular, this is important on that surface region of the mouthpiece lining paper which is arranged around the contact region between the filter part and tobacco strand part, and on that surface region on which the mouthpiece lining paper overlaps itself after being wound around a double cigarette. No elevations 2 need to be provided on other surface regions, and there is also no need for gluing or for gluing everywhere there. This may afford visual and tactile benefits.

In an especially preferred embodiment, the structural lacquer used is what is known as a soft-touch lacquer. This is a lacquer known per se, which, in the cured state, has a rubber-like consistency, that is to say has, where lacquer is concerned, an unusually low modulus of elasticity, an unusually high elasticity range and somewhat unusually high friction, so that the surfaces provided with it have a rubber-like or velvety feel. At the tops of the elevations formed by this lacquer, glue is squeezed away especially effectively, so that the glue layer becomes very thin there, with the result that local drying-out and therefore also the growth of adhesive strength take place especially quickly. A further advantage is that it is possible to manage with smaller adhesive areas, since, due to the high coefficient of friction of the soft-touch lacquer, mouthpiece lining paper and filter wrapping paper virtually adhere to one another even on non-adhesively bonded surface regions, but in any event do not slip one on the other.

The formation of elevations from structural lacquer also has an advantageous effect upon the adhesive bonding of the mouthpiece lining paper to the filter wrapping paper or to the cigarette paper even when the elevations 2 lie only on the outside of the mouthpiece lining paper, that is to say on the side facing away from the filter wrapping paper or the cigarette paper. To be precise, because of the local elevations, when the mouthpiece lining paper is joined to the other layers the pressure force between the mouthpiece lining paper and the further layers is highly uneven over the contact surface. As a result, glue is squeezed away at the locations of higher pressure, and therefore the glue layer remaining there becomes very thin and consequently dries out more quickly and thus increases adhesion. In an embodiment which is especially advantageous as regards adhesive bonding, local elevations 2 are applied on both sides of the foil 1, but are offset to one another in the plane of the foil to an extent such that their bases located on the foil do not overlap one another, but instead are slightly spaced apart. When the mouthpiece lining paper is joined to the layers lying beneath it, the mouthpiece lining paper is deformed into a kind of undulating landscape, with the result that the adhesive surface is increased and a network of spaces, into which the excess glue can be squeezed, is provided.

Figure 3:
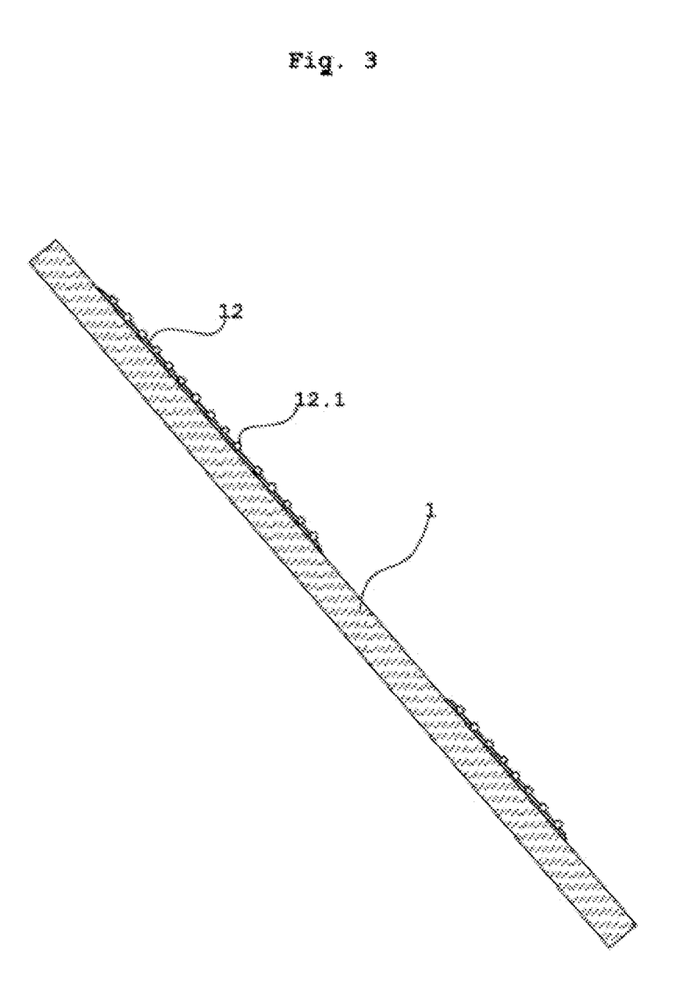
FIG. 3 shows a stylized lateral sectional view of a second mouthpiece lining paper according to the invention.

FIG. 3 shows a mouthpiece lining paper according to the invention which is composed of a foil 1 and of a print which is formed by a lacquer layer 12 and by what are known as structural pigments adhering to this. The structural pigments are grains which by virtue of their size project markedly from the lacquer layer 12 and thus form the local elevations 12.1 according to the invention. The structural pigments may typically have a diameter of about 5 to about 25 µm, while the lacquer layer has a thickness of only 1 µm.

The structural pigments may already be contained in the lacquer or they may be applied in a separate operation to the lacquer layer which, if necessary, is still moist. For example, they may be sprinkled as a dry powder of solid particles or they may be applied as dispersions of solid particles in a liquid matrix, in which case the liquid matrix, after being applied, can cure or evaporate.

It is especially advantageous to use as material for the structural pigments one which has a high inner surface and can absorb water well, that is to say can also be wetted well by water. Materials highly suitable for this purpose are precipitated silicic acids (silica gel), zeolites (alumino-silicates), bentonites (natural clay minerals with a high inner surface), magnesium oxide (magnesia), lithopone (white pigment of barium sulfate).

In an especially advantageous version, the lacquer layer 12 or the structural lacquer from which the elevations 2 according to FIG. 1 are formed may additionally also contain said materials with a high inner surface as pigments which do not necessarily have to project.

The lacquer layer 12 according to FIG. 3 may, of course, also be formed from structural lacquer.

Instead of the elevations 2 being formed by the application of a foreign substance, they may also be formed by the shaping of the material of the foil itself, typically by embossing with punching-out or embossing rollers having corresponding patterns. What is advantageous in embossing is that there is no need for a separate material to be applied. However, it may sometimes be a disadvantage that embossing not only deforms the inside of the mouthpiece lining paper, but also the outside, so that a structure is visible and perceptible there.

Instead of elevations, depressions may, of course, also be formed by the shaping of the foil material, in particular by embossing. Embossing of the mouthpiece lining paper is a highly advantageous method particularly for the adhesive preparation of the overlap region of a mouthpiece lining paper, since the outside and inside of the mouthpiece lining paper are connected to one another at the overlap region. By embossing, the mouthpiece lining paper can be shaped in this region such that a pattern of elevations on the inside of the mouthpiece lining paper is fixed together with a complementary pattern of depressions on the outside of the mouthpiece lining paper, in such a way that, in joining together, elevations project from the inside of one surface margin of the mouthpiece lining paper into depressions on the outside of the other surface margin of the mouthpiece lining paper, thus resulting in the two margins being held approximately in a form fit against slipping one on the other.

Depressions may, of course, also be formed effectively on the mouthpiece lining paper by the removal of the foil material and/or of the material of a coating applied, where appropriate, to the foil.

This removal may take place, for example, by means of a laser, the advantage of this being that especially fine and clearly defined patterns of depressions can be formed, and that the cut surfaces formed can be at a very steep angle to the plane of the foil, and that laser treatment acts upon the cut surfaces in a similar way to a chemical activator which improves the adhesive strength.

However, depressions may also be formed by mechanical roughening, for example by brushing, abrading or drawing the foil over a fine comb having sharp teeth or by sand blasting.

In an especially advantageous version, a lacquer layer which has pigments with a high inner surface and with good wettability by water is first applied to the foil, and the cured lacquer layer is then scored or roughened, for example, by means of the abovementioned methods or is partially removed by laser, so that it acquires an especially large furrowed surface in which many of said particles lie completely freely with part of their surface.

Figure 4:
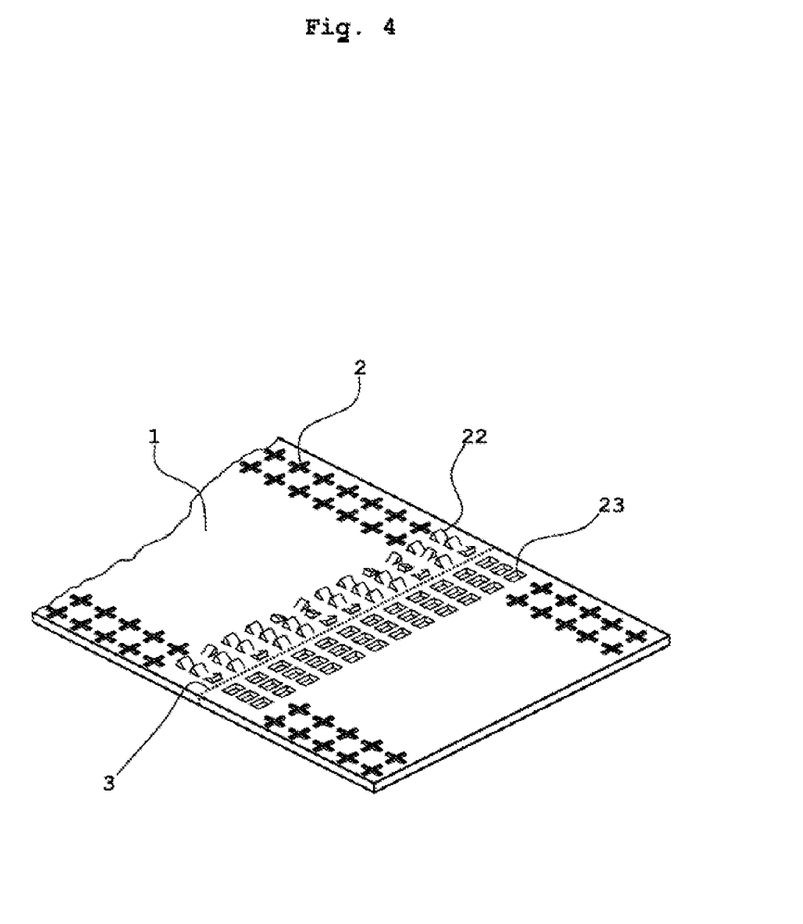
FIG. 4 shows, in an illustration like that in FIG. 1, a portion of a third mouthpiece lining paper. That cutting plane at which an individual mouthpiece lining paper is separated from a continuous roll of a large number of mouthpiece lining papers is shown by the line 3 depicted by dots.

FIG. 4 sketches an exemplary mouthpiece lining paper in which elevations 22 are formed by a combination of punching-out and embossing, so as to raise out of the plane of the mouthpiece lining paper short, approximately rectangular material tongues which are still in direct material connection to the remaining mouthpiece lining paper only with one of their four marginal lines. The depressions 23 according to FIG. 4 are formed by the punching-out of material. In the example according to FIG. 4, those surface regions of a mouthpiece lining paper which are folded one over the other in the cigarette machine and adhesively adhesively bonded to one another are provided with depressions 23 formed as punched-out portions or with elevations 22 formed by partial punching-out and embossing. Since the elevations rise out of the inside of the mouthpiece lining paper and since the depressions 23 are arranged with the same grid dimensioning as the elevations 22, and since the dimensions of the base of the elevations 22 are somewhat smaller than the dimensions of the base of the depressions 23, the elevations 22 can engage into the depressions 23 when the mouthpiece lining paper is being wound in the cigarette machine. Good mechanical anchoring of the two overlapping marginal regions of the mouthpiece lining paper against their slipping out of place one on the other is consequently achieved. It is advantageous not to arrange on the same side, in all the material tongues which form the elevations 22, those marginal sides on which the material tongue are connected to the remaining foil 1, but instead to arrange individual material tongues so as to be rotated in relation to other material tongues about axes normal to the plane of the foil 1. This improves securing against the slipping of the two overlapping regions out of place in all directions in the plane of connection. Since the boundary surfaces, lying at an inclination to the plane of the foil 1, of the elevations 22 and depressions 23 are also adhesive surfaces, adhesive bonding is, of course, also improved per se.

As a result of said measures, mouthpiece lining papers which are formed from foil can be adhesively adhesively bonded substantially more quickly by means of the same glues which can be used for conventional mouthpiece lining papers composed of paper.

The invention claimed is:

1. A mouthpiece lining paper of a filter cigarette, which mouthpiece lining paper is a foil and is provided on surface regions to be adhesively bonded, on a side coming into contact with adhesive, with a three-dimensional surface structure, that is to say with a surface which has elevations and/or depressions and intermediate height jumps, these elevations and depressions respectively rising out of the surface of the foil and being set back from the surface of the foil only locally, wherein the elevations and/or depressions are arranged solely at one or both margins of the mouthpiece lining paper which, on the finished cigarette, run along an overlap region of the mouthpiece lining paper with itself.

2. The mouthpiece lining paper as claimed in claim 1, wherein an elevation or setback with respect to the original foil surface amounts to at least 0.5 μm, and in that at least 2 height jumps occur per 1 cm of length along a direction parallel to the foil surface.

3. The mouthpiece lining paper as claimed in claim 1, wherein an elevation or setback with respect to the original foil surface amounts to at least 1.5 μm, and in that at least 10 height jumps occur per 1 cm of length along a direction parallel to the foil surface.

4. The mouthpiece lining paper as claimed in claim 3, wherein the height jumps are at least 5 μm.

5. The mouthpiece lining paper as claimed in claim 1, wherein individual elevations and depressions are spaced apart respectively from other elevations and depressions in an island-like manner.

6. The mouthpiece lining paper as claimed in claim 1, wherein the elevations are formed from structural lacquer.

7. The mouthpiece lining paper as claimed in claim 6, wherein the structural lacquer is a soft-touch lacquer.

8. The mouthpiece lining paper as claimed in claim 6, wherein local elevations made from structural lacquer are applied on both sides of the foil, elevations located on different sides of the foil being offset to one another in a plane of the foil to an extent such that their bases located on the foil do not overlap one another, but instead are spaced apart from one another.

9. A mouthpiece lining paper of a filter cigarette, which mouthpiece lining paper is a foil and is provided on surface regions to be adhesively bonded, on a side coming into contact with adhesive, with a three-dimensional surface structure, that is to say with a surface which has elevations and/or depressions, these elevations and depressions respectively rising out of the surface of the foil and being set back from the surface of the foil only locally, wherein elevations are formed by structural pigments which are grains which, because of their size, rise out of a lacquer layer or structural lacquer layer applied to the surface of the foil.

10. The mouthpiece lining paper as claimed in claim 9, wherein the structural pigments are formed from a material having good water absorbency.

11. The mouthpiece lining paper as claimed in claim 9, wherein the pigments are formed from precipitated silicic acids, zeolites, bentonites, magnesium oxide or lithopone.

12. The mouthpiece lining paper as claimed in claim 6, wherein the elevations are located solely on that side of the mouthpiece lining paper which is to be arranged so as to face away from a filter wrapping paper when applied to a filter cigarette.

13. The mouthpiece lining paper as claimed in claim 1, further comprising two marginal surface regions which overlap one another on a finished cigarette, one marginal surface region is provided with a pattern of elevations and the other marginal surface region with a pattern of depressions, the elevations of the one marginal surface region being pluggable into the depressions of the other marginal surface region.

14. A mouthpiece lining paper of a filter cigarette, which mouthpiece lining paper is a foil and is provided on surface regions to be adhesively bonded, on a side coming into contact with adhesive, with a three-dimensional surface structure, that is to say with a surface which has elevations and/or depressions, these elevations and depressions respectively rising out of the surface of the foil and being set back from the surface of the foil only locally, wherein the foil is composed of cellulose hydrate.

15. The mouthpiece lining paper as claimed in claim 14, wherein elevations and depressions were formed by shaping of the foil.

16. The mouthpiece lining paper as claimed in claim 15, wherein the elevations and depressions were formed by embossing.

17. The mouthpiece lining paper as claimed in claim 15, wherein elevations are formed by partially punching-out of surface regions and by these surface regions being folded open.

18. The mouthpiece lining paper as claimed in claim 14, wherein depressions were formed by punching-out of the foil material.

19. The mouthpiece lining paper as claimed in claim 14, wherein depressions were formed by the removal of the foil material and/or of the material of a coating applied to the foil.

20. The mouthpiece lining paper as claimed in claim 19, wherein removal took place by laser.

21. The mouthpiece lining paper as claimed in claim 20, wherein removal took place by mechanical roughening.

22. The mouthpiece lining paper as claimed in claim 21, wherein depressions were formed by a method wherein a lacquer layer which has pigments with good water absorbency is first applied to the foil and cured, and cured lacquer layer is scored or roughened or is partially removed by laser.

* * * * *